(12) United States Patent
Wong et al.

(10) Patent No.: US 9,042,500 B1
(45) Date of Patent: May 26, 2015

(54) VERY LOW INTERMEDIATE FREQUENCY (VLIF) RECEIVER AND METHOD OF CONTROLLING A VLIF RECEIVER

(71) Applicant: MOTOROLA SOLUTIONS, INC, Schaumburg, IL (US)

(72) Inventors: Yew Leong Wong, Melaka (MY); Chow Loong Cheah, Ipoh (PE); Li Choo Chen, Bayan Lepas (MY); Yadunandana N Rao, Sunrise, FL (US); Moh Lim Sim, Bayan Lepas (MY); Ondy Dharma Indra Sukma, Medan (ID)

(73) Assignee: Motorola Solutions, Inc., Schaumburg, IL (US)

( * ) Notice: Subject to any disclaimer, the term of this patent is extended or adjusted under 35 U.S.C. 154(b) by 1 day.

(21) Appl. No.: 14/109,528

(22) Filed: Dec. 17, 2013

(51) Int. Cl.
  *H03D 1/04* (2006.01)
  *H04B 1/12* (2006.01)
(52) U.S. Cl.
  CPC ...................... *H04B 1/123* (2013.01)
(58) Field of Classification Search
  CPC .............. H04B 1/14; H04B 1/16; H04B 1/20; H04B 1/28; H04B 1/30; H04B 1/0039; H04B 17/20
  See application file for complete search history.

(56) References Cited

U.S. PATENT DOCUMENTS

| 7,184,714 | B1 | 2/2007 | Kutagulla et al. |
| 7,362,814 | B2 | 4/2008 | Sugar |
| 7,453,934 | B2 | 11/2008 | Seppinen et al. |
| 8,064,863 | B1* | 11/2011 | Reed et al. ..................... 455/285 |
| 8,374,297 | B2 | 2/2013 | Komaili et al. |
| 8,446,995 | B2 | 5/2013 | Zeng |
| 2005/0143038 | A1 | 6/2005 | Lafleur |
| 2006/0270375 | A1* | 11/2006 | Beamish et al. .............. 455/311 |
| 2008/0227421 | A1* | 9/2008 | Balakrishnan ............. 455/233.1 |
| 2010/0173601 | A1 | 7/2010 | Beamish et al. |
| 2010/0330947 | A1* | 12/2010 | Khoury et al. ................ 455/302 |
| 2012/0020389 | A1 | 1/2012 | Mikhemar et al. |
| 2012/0213096 | A1 | 8/2012 | Krishnamurthy et al. |
| 2012/0269245 | A1* | 10/2012 | Mehrmanesh et al. ....... 375/224 |

OTHER PUBLICATIONS

Rykaczewski, et al., "Non-Data-Aided I/Q Imbalance Compensation Using Measured Receiver Front-End Signals", The 17th Annual IEEE International Symposium on Personal, Indoor and Mobile Radio Communications (PIMRC'06), Sep. 11-14, 2006. pp. 1-5.

* cited by examiner

*Primary Examiner* — Syed Haider
(74) *Attorney, Agent, or Firm* — Barbara R. Doutre (57) ABSTRACT

A very-low intermediate frequency (VLIF) receiver and a method of controlling a VLIF receiver. The method comprises receiving a first signal, the first signal including one or both of an on-channel signal portion and an adjacent channel interferer (ACI) portion; determining that the first signal includes a portion having a strength that is above a threshold; in response to determining that the first signal includes a portion having a strength that is above the threshold, estimating one or more IQ imbalance parameters for at least a portion of the first signal; and compensating for an IQ imbalance in at least the portion of the first signal using the one or more IQ imbalance parameters.

14 Claims, 5 Drawing Sheets

VERY LOW INTERMEDIATE FREQUENCY (VLIF) RECEIVER AND METHOD OF CONTROLLING A VLIF RECEIVER

BACKGROUND OF THE INVENTION

Very Low Intermediate Frequency (VLIF) receivers are popular due to their relatively low cost and small size, as well as their ability to operate over a broad range of frequencies. A VLIF receiver mixes a received radio frequency (RF) signal with a local oscillator prior to analogue to digital conversion. The local oscillator is set at a frequency close to that of the RF signal, but differing by an offset that is referred to as an intermediate frequency. For example, the intermediate frequency is typically between 3.6 kHz to 5.7 kHz, depending on channel spacing.

The local oscillator thus operates at a frequency either just above or just below the frequency of the RF signal, i.e., on one "side" of the RF signal. At times, this results in interference from an adjacent channel interferer on the side of the RF signal where the local oscillator is operating.

The down-mixed RF signal comprises an in-phase component, I, and a quadrature component, Q. Due to receiver components mismatch, there can be an amplitude and phase imbalance in otherwise perfectly balanced I and Q signals. An imbalance in the I and Q introduces an undesired spectral component referred to as the image signal that adversely impacts the receiver performance. In particular, when there is an adjacent channel interferer close to the desired signal of interest, the receiver performance can be severely degraded if the image of the adjacent channel signal falls within the frequencies occupied by the desired signal.

I/Q imbalance algorithms exist that attempt to estimate amplitude and phase imbalances in the RF signal and compensate for the imbalance. Fixed amplitude and phase imbalance compensation factors can, for example, be obtained as part of a factory tuning process. However, such phase imbalance compensation factors generally work adequately only under certain conditions.

Further, adaptive I/Q imbalance algorithms exist that use higher order statistics or other assumptions to estimate amplitude and phase imbalances in the RF signal. Such algorithms are, however, often complex and not sufficiently robust to changes in I and Q imbalance parameters.

Accordingly, there is a need for an improved VLIF receiver and a method of controlling a VLIF receiver.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to one aspect, the invention resides in a method of controlling a very low intermediate frequency (VLIF) receiver, the method comprising: receiving a first signal, the first signal including one or both of an on-channel signal portion and an adjacent channel interferer (ACI) portion; determining that the first signal includes a portion having a strength that is above a threshold; in response to determining that the first signal includes a portion having a strength that is above a threshold, estimating one or more IQ imbalance parameters for at least a portion of the first signal; and compensating for an IQ imbalance in at least the portion of the first signal using the one or more IQ imbalance parameters.

Figure 1:
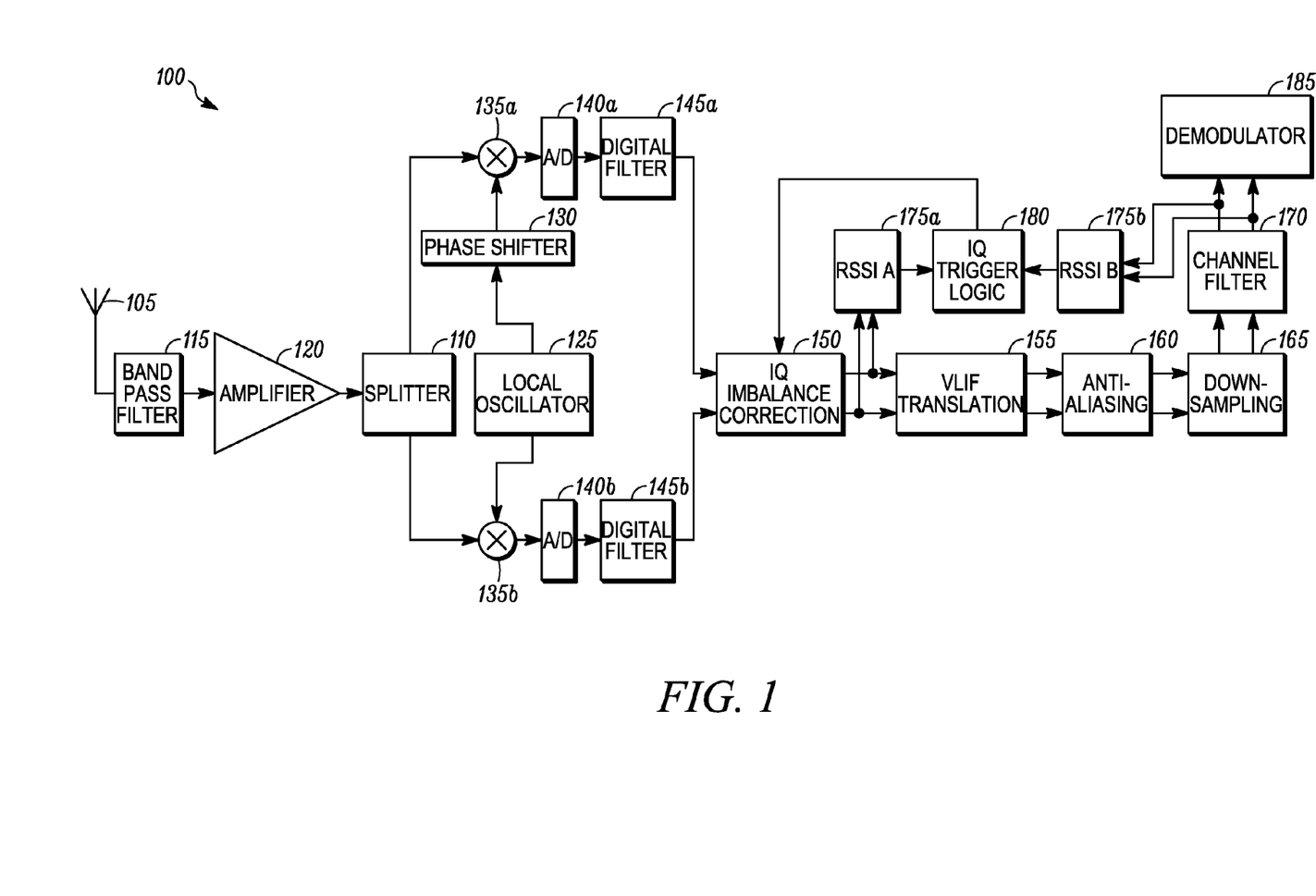
FIG. 1 is a block diagram of a Very Low Intermediate Frequency (VLIF) receiver in accordance with some embodiments.

FIG. 1 is a block diagram of a Very Low Intermediate Frequency (VLIF) receiver 100, according to an embodiment of the present invention.

The VLIF receiver 100 includes an antenna 105, for receiving a radio frequency (RF) signal, the antenna 105 coupled to a splitter 110 by a band pass filter 115 and an amplifier 120. The splitter 110 splits the signal into an in-phase signal and a quadrature signal, thus extracting an in-phase component, I, and a quadrature component, Q, respectively.

The I and Q components are extracted using a local oscillator 125. The local oscillator 125 generates a reference signal, which is added to the in-phase and quadrature signals. The reference signal is at a frequency close to that of the RF signal, but differing by an offset referred to as an intermediate frequency. The reference signal is then phase shifted 90 degrees by a phase shifter 130 before being added to the quadrature signal using a first mixer 135a. The reference signal is then added to the in-phase signal without phase shift, i.e., shifted by 0 degrees, by a second mixer 135b. The I and Q components are digitized by analogue to digital converters 140a, 140b and then filtered by digital filters 145a, 145b.

The digital filters 145a, 145b can be low pass filters, band pass filters, notch filters, or any other suitable filter for filtering out of band noise.

The filtered I and Q components are then provided to an I/Q imbalance correction module 150, which estimates and compensates for amplitude and phase errors in the I and Q components, respectively.

The person of ordinary skill in the art will readily appreciate that various I/Q imbalance algorithms can be used. As an illustrative example, amplitude error can be estimated according to sample means of I and Q components respectively. Similarly, the phase error can be estimated according to a mathematical relationship between the I and Q components, as is well understood in the art.

The VLIF receiver 100 further includes a VLIF translation module 155, which receives I/Q imbalance corrected I and Q elements from the IQ imbalance correction module 150 and performs VLIF translation on the I and Q elements. The VLIF translation module translates the I and Q elements from the first intermediate frequency (i.e., a VLIF) to zero intermediate frequency. The VLIF translated I and Q elements are then input into an anti-aliasing module 160, which performs anti-aliasing, followed by a down-sampling module 165, which performs down-sampling of the signal, and a channel filter 170, which provides a band pass filtration of the signal.

A first Received Signal Strength Indication (RSSI) module 175a calculates a first strength of the signal in the I and Q elements of the signal prior to VLIF translation by the VLIF translation module. A second RSSI module 175b calculates a second strength of the signal in the I and Q elements of the signal subsequent to VLIF translation, anti-aliasing, down sampling and channel filtering.

The first and second signal strengths are then provided to an IQ trigger logic module 180, which estimates a strength of an interferer according to a difference between the first signal strength and the second signal strength. The IQ trigger logic module 180 provides input to the IQ imbalance correction module 150, and thus indicates whether the IQ imbalance parameters should be calculated.

In particular, the IQ trigger logic module 180 provides trigger logic to control when I/Q imbalance estimation is performed. According to embodiments of the present invention, I/Q imbalance estimation is triggered when a portion of the signal has a strength that is above a certain threshold, and not triggered otherwise. The IQ trigger logic module 180 can thus ensure that the I/Q imbalance estimation is not biased by noise when signal levels are low.

According to certain embodiments, the IQ trigger module 180 provides a trigger when a strength of an on-channel portion of the signal is above a first threshold, and/or when a strength of an adjacent channel interferer (ACI) portion of the signal is above a second threshold.

According to some embodiments, the IQ trigger module 180 provides a trigger when a difference between a received signal strength indicator (RSSI) of the signal prior to VLIF translation and a received signal strength indicator (RSSI) of the signal subsequent to VLIF translation is greater than a threshold.

Finally, the signal from the channel filter 170 is provided to a demodulator module 185 for demodulation of the signal.

Figure 2:
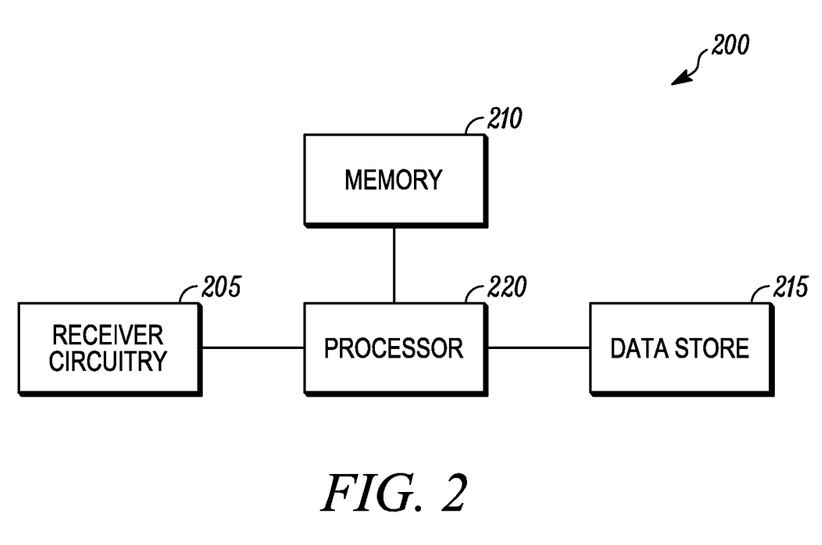
FIG. 2 illustrates an architecture of a VLIF receiver, in accordance with some embodiments.

FIG. 2 illustrates an architecture of a VLIF receiver 200, according to an embodiment of the present invention. The VLIF receiver 200 can be similar or identical to the VLIF receiver 100 of FIG. 1.

The VLIF receiver 200 includes receiver circuitry 205, a memory 210, and a data store 215. A processor 220 is coupled to the receiver circuitry 205, memory 210, and data store 215.

The receiver circuitry 205 provides an interface to in-phase (I) and quadrature (Q) signals of the VLIF receiver 200, and includes elements for receiving and processing a wireless signal, such as analogue to digital converters, a filter amplifier and the like. In particular, one or more of components 115, 120, 110, 125, 130, 135a, 135b, 140a, and 140b of VLIF receiver 100 can be implemented by receiver circuitry 205 and other components of VLIF receiver 100 can be implemented by the processor 220 and programs and instructions stored in memory 210 and data stored in data store 215. However, one of ordinary skill in the art will appreciate that further components of the VLIF receiver 100, such as digital filters 145a, 145b and the IQ imbalance correction module 150, can instead may be implemented in receiver circuitry 205 or, for example, in integrated circuits (ICs), application specific integrated circuits (ASICs), field programmable gate arrays (FPGAs), and the like, such as ASICs implemented in VLIF receiver 200. Based on the present disclosure, one skilled in the art will be readily capable of producing and implementing such software and/or hardware without undo experimentation.

The processor 220 is able to process the digital I and Q signals and, for example, can apply I/Q imbalance correction as described with reference to the IQ imbalance correction module 150. A shared memory on which a flag is written can be used to communicate between the receiver circuitry 205 and the processor 220.

The processor 220 processes computer readable program code components stored in the memory 210 and implements various methods and functions of the VLIF receiver 100 as described herein. Examples of functions include determining when to estimate IQ parameters.

The data store 215 includes data, such as interference data, thresholds, filter tap data, or any other persistent or dynamic data. As will be understood by a person skilled in the art, a single memory, such as the memory 210, can be used to store both dynamic and static data.

The VLIF receiver 200 can include a system bus (not shown) that couples various system components, including coupling the memory 210 to the processor 220. The system bus can be any of several types of bus structures including a memory bus or memory controller, a peripheral bus, and a local bus using any of a variety of bus architectures.

The processor 220 and memory 210 can be replaced by dedicated hardware, and the VLIF receiver 200 can include software, hardware, firmware, or any combination thereof.

The structure of memory 210 can include random access memory (RAM), dynamic random access memory (DRAM), and/or read only memory (ROM) or equivalents thereof, that store data and programs that may be executed by the processor 220. For example, the memory 210 can include a basic input/output system (BIOS) stored in a read only memory (ROM) and one or more program modules such as operating systems, application programs and program data stored in random access memory (RAM).

Any synchronization between the receiver circuitry 205 and software of the memory 210 can be achieved by using a status word in the memory 210. When IQ parameters are determined, for example, the status word can be updated to reflect the new configuration. Similarly, if the receiver circuitry 205 detects a change in the status word, it can determine whether to generate IQ parameters accordingly.

Figure 3:
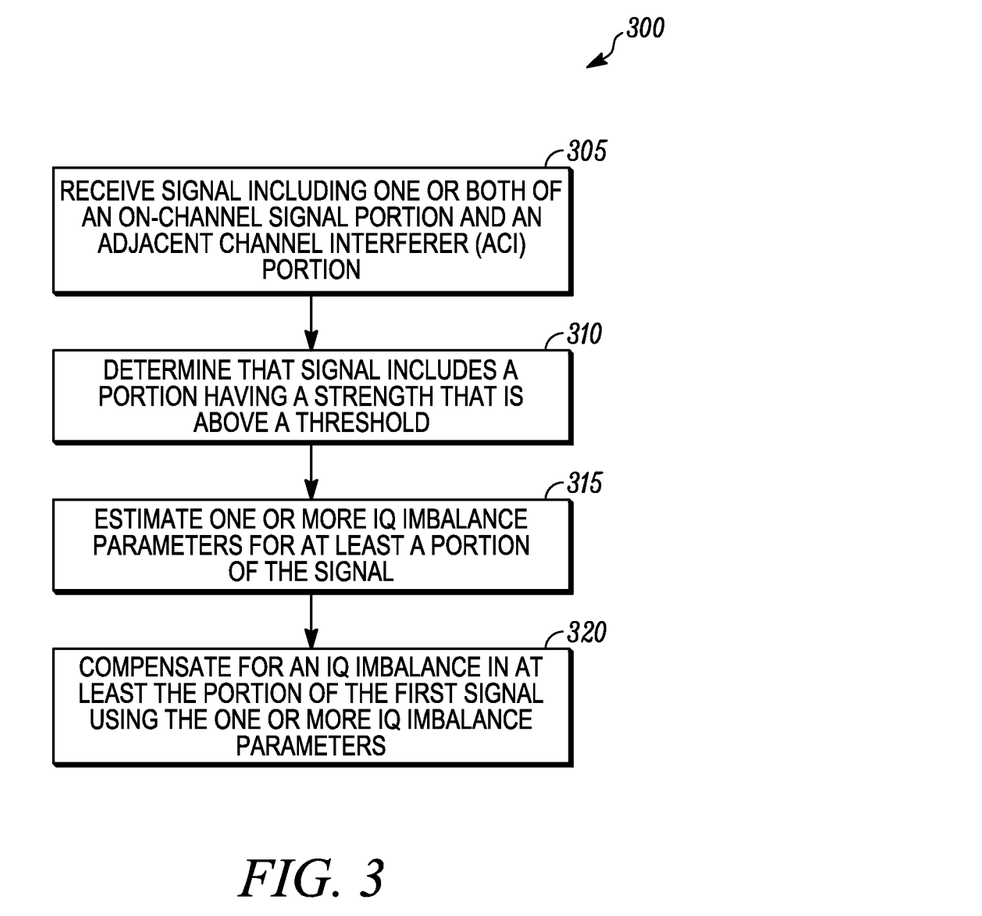
FIG. 3 illustrates a method of controlling a VLIF receiver, in accordance with some embodiments.

FIG. 3 illustrates a method 300 of controlling a VLIF receiver, according to an embodiment of the present invention. The VLIF receiver can be similar to or identical to the VLIF receiver 100 of FIG. 1 or the VLIF receiver 200 of FIG. 2. At block 305, a first signal is received. The first signal is an RF signal that is received, for example, by the antenna 105 of the VLIF receiver 100. The first signal includes one or both of an on-channel signal portion and an ACI portion. As discussed below, the first signal can, for example, be part of a signal that is continuously received, or part of a priority scan.

At block 310, it is determined, for example by the processor 220 of the VLIF receiver 200, that the first signal includes a portion having a strength that is above a threshold. This can comprise: a) determining that a strength of the on-channel signal portion is above a first threshold, b) determining that a strength of the ACI portion is above a second threshold, and/or c) determining that a difference between a received signal strength indicator (RSSI) of the first signal prior to VLIF translation, and a received signal strength indicator (RSSI) of the first signal subsequent to VLIF translation, is greater than a threshold.

At block 315, one or more IQ imbalance parameters are estimated for at least a portion of the first signal, in response to determining that the first signal includes a portion having a strength that is above a threshold. The one or more IQ imbalance parameters can be estimated by, for example, the processor 220 of the VLIF receiver 200. By estimating the IQ imbalance parameters in response to determining that the strength is above a threshold ensures that the IQ parameters are not biased by noise when the signal levels are low.

The IQ imbalance parameters can comprise an amplitude error parameter and a phase error parameter. In particular, a phase error of the signal and an amplitude error of the signal can be estimated independently. This enables independent adaptation to be performed for both phase error and amplitude error.

At block 320, the one or more IQ imbalance parameters are used to compensate for an IQ imbalance in at least the portion of the first signal. The compensation of IQ imbalance can be performed by, for example, the processor 220 of the VLIF receiver 200. As discussed further below, the IQ imbalance parameters can be initially generated and refined over time.

Figure 4:
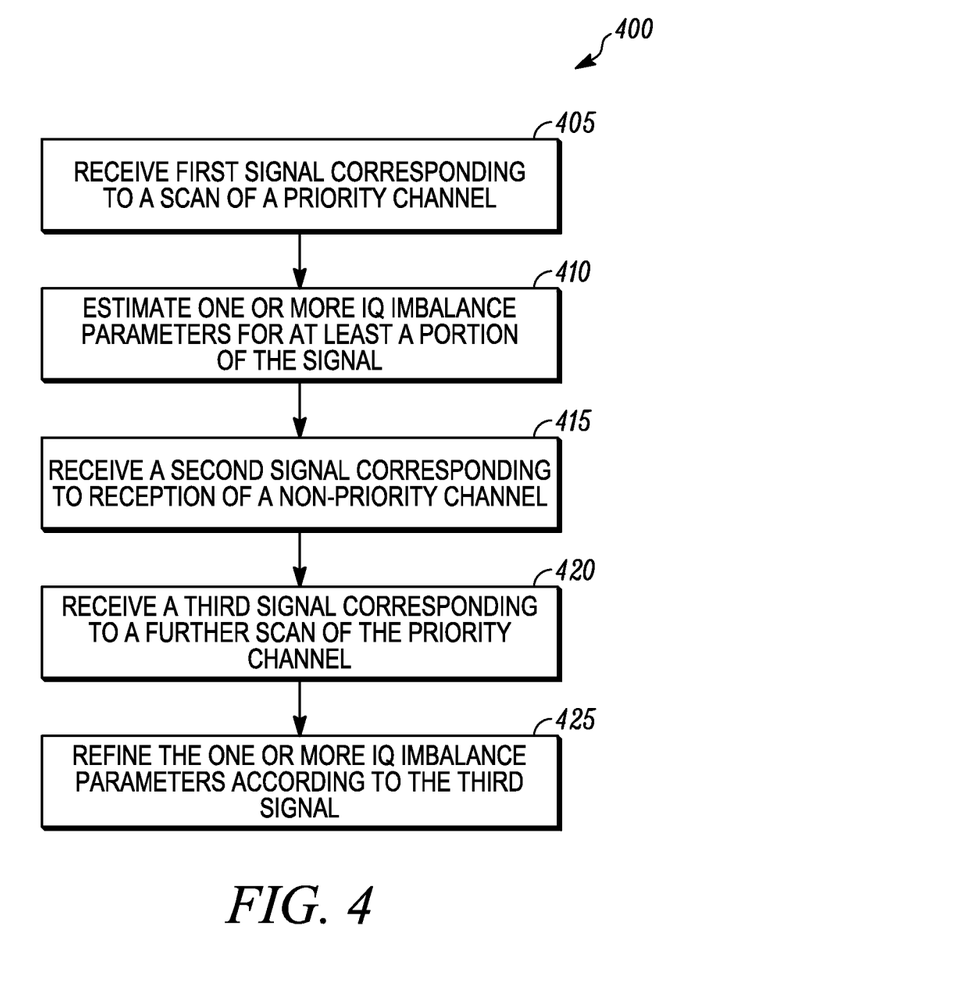
FIG. 4 illustrates a method of channel scanning, in accordance with some embodiments.

FIG. 4 illustrates a method 400 of channel scanning, according to an embodiment of the present invention. The method 400 can be performed on the VLIF receiver 100 of FIG. 1 or the VLIF receiver 200 of FIG. 2.

At block 405, a first signal is received, the first signal corresponding to a scan of a priority channel. The first signal can, for example, be received by the antenna 105 of the VLIF receiver 100.

At block 410, one or more IQ imbalance parameters are estimated for at least a portion of the first signal, in response to determining that the first signal includes a portion having a strength that is above a threshold. The IQ imbalance parameter can, for example, be estimated by the processor 220 of the VLIF receiver 220.

At block 415, a second signal is received, the second signal corresponding to reception of a non-priority channel, and at block 420, a third signal is received, the third signal corresponding to a further scan of the priority channel. As is known in the art, a priority channel is a channel that is periodically sampled during the reception of another signal, in order that the receiver may be automatically tuned to the priority channel in the event of a transmission thereon, as opposed to a non-priority channel, which might not be sampled during reception of the priority channel. The second and third signals can, for example, be received by the antenna 105 of the VLIF receiver 100.

At block 425, the one or more IQ imbalance parameters are revised according to the third signal. The IQ imbalance parameters can, for example, be revised by the processor 220 of the VLIF receiver 220, using the methods described above.

The method 400 enables parameters of a priority channel previously saved to be recalled and used in the sampling interval of the priority channel to correct IQ imbalance caused by an interferer. This further enables a converged amplitude and phase compensation to be applied on the IQ data, which in turn avoids loss of data, such as audio holes, in the priority sampling.

The IQ imbalance parameters can be stored in a memory, such as in the form of a variable in random access memory, or in a data store. This enables the VLIF receiver to generate IQ imbalance parameters when performing priority scans, even when each individual scan is alone not sufficient to provide reliable parameters.

According to certain embodiments, the IQ parameters are limited in step size, such that at each refinement of the IQ parameters, they are only able to be changed a limited amount. This prevents the IQ parameters from rapidly diverging into, for example, a local minimum. Furthermore, according to certain embodiments, the IQ parameters are limited according to an absolute value. The absolute value can comprise IQ parameters of a tuned VLIF receiver, plus/minus an outer bound.

According to certain embodiments, the IQ imbalance parameters are generated according to a cumulative mean averaging of the first signal, as the first signal is received. In particular, IQ parameters can be quickly determined based upon a very limited amount of data, and refined as further data is received.

For example, according to certain embodiments, a first estimate of the IQ parameters is provided after 5 ms of data is received, followed by an estimation every 2.5 ms until 150 ms of data is received. Future estimates are then produced only once every 150 ms.

Figure 5:
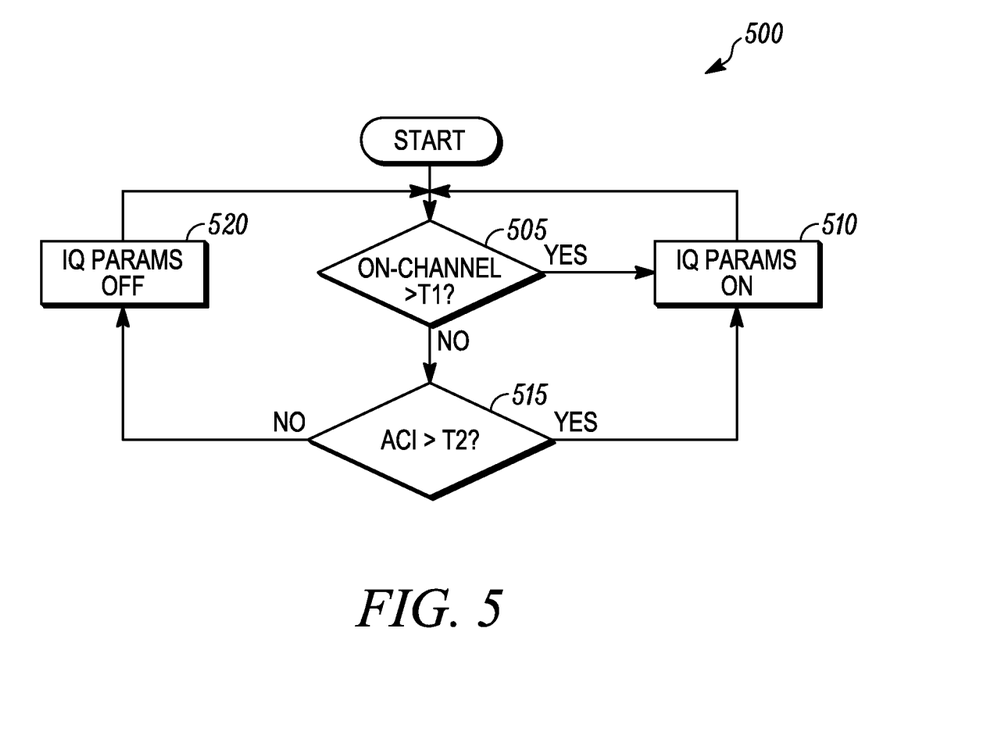
FIG. 5 illustrates a method of controlling a VLIF receiver, in accordance with some embodiments.

FIG. 5 illustrates a method 500 of controlling a VLIF receiver according to a further embodiment of the present invention. The VLIF receiver can be similar to or identical to the VLIF receiver 100 of FIG. 1 or the VLIF receiver 200 of FIG. 2. In the latter case, the method 500 can be executed by the processor 220.

At block 505, it is determined if a strength of an on-channel signal portion is above a first threshold (T1). If so, an IQ parameters flag is set to true in block 510.

If the strength of the on-channel signal portion is not above the first threshold, it is determined if a strength of an ACI portion is greater than a second threshold (T2) in block 515. If the strength of an ACI portion is greater than the second threshold (T2), the IQ parameters flag is set to true in block 510. Otherwise, the IQ parameters flag is set to false in block 520.

According to some embodiments, the method 500 can be advantageously run continuously. Accordingly, an IQ parameter estimation module can periodically or continuously check the IQ parameters flag and generate or not generate IQ parameters.

This enables the IQ parameter estimation module to be run only when a signal strength is sufficiently high, and not otherwise, which in turn ensures that the IQ parameters do not adapt to noise.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of controlling a very low intermediate frequency (VLIF) receiver, the method comprising:
   receiving a first signal, by the VLIF receiver, the first signal including one or both of an on-channel signal portion and an adjacent channel interferer (ACI) portion;
   determining that the first signal includes a portion having a strength that is above a threshold, the determination being made by comparing a received signal strength indicator (RSSI) of the first signal prior to VLIF translation, and a received signal strength indicator (RSSI) of the first signal subsequent to the VLIF translation;
   in response to the determining that the first signal includes a portion having a strength that is above the threshold, estimating one or more IQ imbalance parameters for at least a portion of the first signal; and
   compensating for an IQ imbalance in at least the portion of the first signal using the one or more IQ imbalance parameters.

2. The method of claim 1, wherein estimating one or more IQ imbalance parameters comprises:
   estimating an amplitude error in the first signal; and
   estimating a phase error in the first signal.

3. The method of claim 2, wherein the phase error and the amplitude error are estimated independently.

4. The method of claim 3, wherein at least one of the amplitude error and the phase error is estimated in response to determining that a signal to noise ratio of the first signal is higher than a pre-determined threshold.

5. The method of claim 1, further comprising:
   storing the one or more IQ imbalance parameters in a memory;
   subsequently receiving a plurality of other signals, wherein the plurality of other signals includes another signal that is on a same channel as the first signal; and
   revising the one or more IQ imbalance parameters according to the another signal.

6. The method of claim 5, wherein the first signal and the another signal correspond to scans of a priority channel.

7. The method of claim 1, wherein the IQ imbalance parameters are iteratively updated, and wherein each update is limited by a maximum step size.

8. The method of claim 1, wherein the IQ imbalance parameters are iteratively updated, and wherein the IQ imbalance parameters are limited by boundary values.

9. The method of claim 1, wherein the one or more IQ imbalance parameters are generated according to a cumulative mean averaging of the first signal, as the first signal is received.

10. A very low intermediate frequency (VLIF) receiver comprising:
    an antenna;
    a processor coupled to the antenna; and
    a memory coupled to the processor, the memory including instruction code executable by the processor for:
       receiving a first signal by the antenna, the first signal including one or both of an on-channel signal portion and an adjacent channel interferer (ACI) portion;
       determining, by the processor, that the first signal includes a portion having a strength that is above a threshold, the determination being made by comparing a received signal strength indicator (RSSI) of the first signal prior to VLIF translation, and a received signal strength indicator (RSSI) of the first signal subsequent to the VLIF translation;

in response to the determining that the first signal includes a portion having a strength that is above the threshold, estimating, by the processor, one or more IQ imbalance parameters for at least a portion of the first signal; and compensating for an IQ imbalance in at least the portion of the first signal using the one or more IQ imbalance parameters.

11. The VLIF receiver of claim 10, further comprising:

a data store;

wherein the memory further includes instruction code executable by the processor for:

storing the one or more IQ imbalance parameters in data store;

subsequently receiving a plurality of other signals, wherein the plurality of other signals includes another signal that is on a same channel as the first signal; and revising the estimated one or more IQ imbalance parameters according to the another signal.

12. The VLIF receiver of claim 11, wherein the first signal and the another signal correspond to scans of a priority channel.

13. The VLIF receiver of claim 10, wherein the IQ imbalance parameters are iteratively updated, and wherein each update is limited by a maximum step size.

14. The VLIF receiver of claim 10, wherein the one or more IQ imbalance parameters are generated according to a cumulative mean averaging of the first signal, as the first signal is received.

* * * * *